United States Patent Office 3,560,530
Patented Feb. 2, 1971

---

3,560,530
PROCESS FOR THE OXIDATION OF ALKENES TO ALKENE OXIDES
Alvin B. Stiles, Wilmington, Del., assignor to E. I. du Pont de Nemours and Company, Wilmington, Del.
No Drawing. Continuation-in-part of application Ser. No. 596,817, Nov. 25, 1966, which is a continuation-in-part of application Ser. No. 293,156, July 5, 1963, which in turn is a continuation-in-part of application Ser. No. 2,802, Jan. 18, 1960. This application June 19, 1969, Ser. No. 834,904
Int. Cl. C07d 1/14
U.S. Cl. 260—348.5    4 Claims

ABSTRACT OF THE DISCLOSURE

Alkene oxides are prepared in good yield from alkenes having 2–4 carbon atoms using a non-porous silver-cadmium alloy catalyst containing 1 to 15%, by weight of cadmium.

CROSS-REFERENCE TO RELATED APPLICATIONS

This application is a continuation-in-part of my copending application Ser. No. 596,817, filed Nov. 25, 1966 now U.S. Pat. 3,489,787, issued Jan. 13, 1970, which in turn is a continuation-in-part of my then copending application Ser. No. 293,156 filed July 5, 1963, now U.S. Pat. 3,334,143, issued Aug. 7, 1967, which was in turn a continuation-in-part of my then copending application Ser. No. 2,802, filed Jan. 18, 1960, now abandoned.

BACKGROUND OF THE INVENTION

This invention relates to silver catalysts and is more particularly directed to uniform, non-porous silver catalysts which contain small amounts of cadmium and to selective oxidation processes employing such catalysts.

Silver catalysts have heretofore been widely used as selective oxidation catalysts. They have been used for example in the oxidation of methanol to produce formaldehyde and in a variety of other reactions of organic compounds which involve oxidation often accompanied by dehydrogenation.

I have found that the inclusion of a small amount of cadmium uniformly distributed throughout non-porous silver catalysts effects (1) better conversion in organic oxidation processes without loss of yield and (2) better dehydrogenation when dehydrogenation is involved in the particular reaction.

Silver catalysts are already in wide use for oxidation processes and porous silver-cadmium alloys have been found suitable for some oxidations; see MacCormack et al., U.S. Pat. No. 2,837,473. However, activity of such alloys was dependent on porosity. I have discovered that uniform, non-porous silver-cadmium alloys give better results than those normally obtained with silver catalysts, and surprisingly give better results than porous alloys.

SUMMARY OF THE INVENTION

The present invention is directed to a process for oxidizing alkenes having 2 to 4 carbon atoms to alkene oxides using a uniform, non-porous silver-cadmium alloy catalyst containing from 1% to 15%, by weight, of cadmium.

DESCRIPTION OF THE INVENTION

The silver-cadmium catalysts used in the process of this invention can be made in any convenient manner and ordinarily an alloy with silver and cadmium will be prepared simply by fusing the two components together in the desired proportions. Alternatively, finely divided powders of the two metals can be brought together and sintered to form what is, still, essentially an alloy.

Preparation of catalysts by such processes results in a smooth non-porous alloy in which the cadmium is uniformly distributed throughout the silver.

The amount of cadmium can vary from about 1% to 15% by weight based upon the weight of silver. Amounts much less than 1% ordinarily will not produce effects of any significant magnitude. Above 15% the directivity of the catalysts falls off and the catalyst additionally becomes lower melting.

The silver catalysts of the invention can be prepared in any convenient physical form of the types heretofore used for silver. Thus, the silver-cadmium alloys can be formed as wire, as silver gauze, as machine turnings, or as pellets. Additionally the silver can be supported upon various carriers in conventional manner, it being sufficient for the purposes of the invention that the uniform, non-porous silver alloy be able to contact the organic materials to be oxidized.

The preferred catalysts for use in the process of this invention are silver-cadmium alloys containing from 4 to 10% cadmium based on the weight of silver. Such amounts of cadmium are most consistent in producing high conversion without loss of yield.

ALKENES TO BE OXIDIZED

The alkenes which can be oxidized according to the process of this invention are those having from 2 to 4 carbon atoms, such as ethene, propene, 1-butene, 2-butene, and iso-butene.

The alkenes can be oxidized to alkene oxides under those conditions normally used to oxidize alkenes to alkene oxides. In general, the alkenes are oxidized in the presence of air or some other oxygen source at temperatures ranging from about 75° C. to 350° C. The oxidation will ordinarily proceed according to the following exemplary equations:

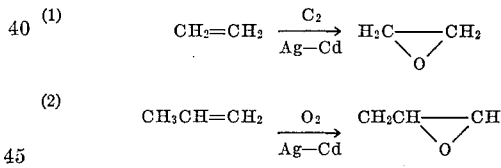

The following examples illustrate the invention. Parts and percentages are by weight unless otherwise stated.

EXAMPLE 1

Preparation of catalysts

This example illustrates how the catalysts can be prepared. One hundred ninety parts of pure silver are fused at 1000° C. with 10 parts of metallic cadmium. The uniform ingot which results can be shaped into any convenient physical form such as wire filaments approximately 0.01 inch in diameter.

EXAMPLE 2

Ethene is oxidized to ethene oxide at 255° C. by passing a stream containing 2–4%, by volume, of ethene in air, over a uniform, non-porous catalyst comprising 95%, by weight, of silver and 5%, by weight, of cadmium. The physical form of the catalyst is 30 mesh wire woven from the 0.01 inch diameter wire of Example 1. The yield is 78% of ethene oxide and the conversion is 28.0%.

EXAMPLE 3

Catalyst of the type described for Example 2 is employed on the same reactor as used in Example 2. A feed consisting of 3% propene in air is passed over the catalyst at 220° C. Conversion is 1.9% of the propene at a yield of 80.3% of propene oxide. At increased temperature the conversion is increased but by-products also are increased, i.e. at 281° C. conversion is 8.1% but yield is 49.0% of propene oxide. Some acrolein is detectable in the product.

EXAMPLE 4

A catalyst is prepared as in Example 1 except that the cadmium content is 15%. This is converted to turnings resembling a ribbon 0.125 inch wide by 0.016 inch thick and is placed on a compressed wad in the converter described for Example 3. A feed of 1.25% butene in air is passed into the converter at 135° C. and a 36% yield of tetrahydrofuran is obtained at a space velocity of 60,000. Other oxidation products such as formaldehyde and propionaldehyde are also detected.

Precaution

In Examples 2–4, it is understood that adequate means must be taken to control the temperature near the value specified. It should also be pointed out that when the gas mixtures are in the explosive range, adequate mixing and control devices must be provided to avoid uncontrolled flame propagation.

What is claimed is:

1. In a process for the preparation of alkene oxides from alkenes of 2 to 4 carbon atoms by the catalytic oxidation in the presence of oxygen, using a silver catalyst, the improvement comprising using as the silver catalyst a uniform, non-porous, silver-cadmium alloy consisting essentially of from 85% to 99%, by weight, silver and from 1% to 15%, by weight, of cadmium.

2. The process of claim 1 wherein the alloy consists essentially of silver which contains from 4% to 10%, by weight, of cadmium.

3. The process of claim 1 wherein the alkene is ethene.

4. The process of claim 1 wherein the alkene is propene.

References Cited

UNITED STATES PATENTS

| | | | |
|---|---|---|---|
| 2,605,239 | 7/1952 | Sears | 260—348.5X |
| 2,686,762 | 8/1954 | Tollefson | 260—348.5X |
| 2,837,424 | 6/1958 | Burford et al. | 260—348.5X |
| 2,837,473 | 6/1958 | MacCormack et al. | 252—475X |

NORMA S. MILESTONE, Primary Examiner

U.S. Cl. X.R.

252—475, 476